United States Patent
Liu et al.

(10) Patent No.: US 8,234,116 B2
(45) Date of Patent: Jul. 31, 2012

(54) CALCULATING COST MEASURES BETWEEN HMM ACOUSTIC MODELS

(75) Inventors: Peng Liu, Beijing (CN); Frank Kao-Ping K. Soong, Warren, NJ (US); Jian-Lai Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1437 days.

(21) Appl. No.: 11/507,859

(22) Filed: Aug. 22, 2006

(65) Prior Publication Data

US 2008/0059184 A1    Mar. 6, 2008

(51) Int. Cl.
G10L 15/14 (2006.01)
G10L 15/10 (2006.01)
G10L 15/28 (2006.01)

(52) U.S. Cl. ............ 704/256.3; 704/256.2; 704/256.1; 704/238; 704/231; 704/256

(58) Field of Classification Search .......... 704/200–201, 704/203–204, 231, 236–240, 243, 246–257, 704/258, 266, 269, E17.006–E17.012, E15.018–E15.035
See application file for complete search history.

(56) References Cited

U.S. PATENT DOCUMENTS

| | | | |
|---|---|---|---|
| 4,903,305 A | 2/1990 | Gillick et al. | |
| 5,293,452 A * | 3/1994 | Picone et al. | 704/250 |
| 5,450,523 A | 9/1995 | Zhao | |
| 5,655,058 A * | 8/1997 | Balasubramanian et al. | 704/255 |
| 5,682,501 A | 10/1997 | Sharman | |
| 5,812,975 A | 9/1998 | Komori et al. | |
| 5,825,978 A | 10/1998 | Digalakis et al. | |
| 5,839,105 A * | 11/1998 | Ostendorf et al. | 704/256 |
| 5,855,011 A * | 12/1998 | Tatsuoka | 706/45 |
| 5,913,193 A | 6/1999 | Huang et al. | |
| 5,950,162 A | 9/1999 | Corrigan et al. | |
| 6,009,390 A * | 12/1999 | Gupta et al. | 704/240 |
| 6,061,652 A * | 5/2000 | Tsuboka et al. | 704/245 |
| 6,104,989 A * | 8/2000 | Kanevsky et al. | 704/9 |
| 6,141,641 A | 10/2000 | Hwang et al. | |
| 6,151,574 A | 11/2000 | Lee et al. | |
| 6,173,263 B1 | 1/2001 | Conkie | |
| 6,278,973 B1 * | 8/2001 | Chung et al. | 704/257 |
| 6,356,865 B1 | 3/2002 | Franz et al. | |

(Continued)

FOREIGN PATENT DOCUMENTS

WO    WO 03083831    10/2003

(Continued)

OTHER PUBLICATIONS

Jon Yi and James Glass, Information-Theoretic Criteria for Unit Selection Synthesis, in *Proceedings of the 7th International Conference on Spoken Language Processing*, Sep. 16-20, 2002, Denver, Colorado, pp. 2617-2620.

(Continued)

*Primary Examiner* — David R Hudspeth
*Assistant Examiner* — David Kovacek
(74) *Attorney, Agent, or Firm* — Westman, Champlin & Kelly, P.A.

(57) ABSTRACT

Measurement of Kullback-Leibler Divergence (KLD) between hidden Markov models (HMM) of acoustic units utilizes an unscented transform to approximate KLD between Gaussian mixtures. Dynamic programming equalizes the number of states between HMMs having a different number of states, while the total KLD of the HMMs is obtained by summing individual KLDs calculated by state pair by state pair comparisons.

16 Claims, 9 Drawing Sheets

U.S. PATENT DOCUMENTS

| | | | |
|---|---|---|---|
| 6,366,883 B1 | | 4/2002 | Campbell et al. |
| 6,529,902 B1 | * | 3/2003 | Kanevsky et al. ............... 707/5 |
| 6,591,146 B1 | * | 7/2003 | Pavlovic et al. ............... 700/29 |
| 6,633,845 B1 | | 10/2003 | Logan et al. |
| 6,697,780 B1 | | 2/2004 | Beutnagel et al. |
| 6,816,830 B1 | * | 11/2004 | Kempe .............................. 704/9 |
| 6,931,374 B2 | | 8/2005 | Attias et al. |
| 6,961,704 B1 | | 11/2005 | Phillips et al. |
| 6,993,452 B2 | * | 1/2006 | Huang et al. .................. 702/179 |
| 7,062,436 B1 | * | 6/2006 | Odell et al. .................... 704/255 |
| 7,076,102 B2 | * | 7/2006 | Lin et al. ....................... 382/218 |
| 7,308,443 B1 | * | 12/2007 | Lee et al. ......................... 707/3 |
| 7,603,276 B2 | | 10/2009 | Yoshizawa |
| 7,624,020 B2 | * | 11/2009 | Yamada et al. ............... 704/277 |
| 2001/0011218 A1 | * | 8/2001 | Phillips et al. ................ 704/256 |
| 2001/0018654 A1 | | 8/2001 | Hon et al. |
| 2001/0056347 A1 | | 12/2001 | Chazan et al. |
| 2002/0065959 A1 | * | 5/2002 | Kim et al. ......................... 710/1 |
| 2002/0150300 A1 | * | 10/2002 | Lee et al. ...................... 382/229 |
| 2003/0033145 A1 | * | 2/2003 | Petrushin ....................... 704/236 |
| 2003/0055641 A1 | | 3/2003 | Yi et al. |
| 2003/0065510 A1 | | 4/2003 | Sato |
| 2004/0095374 A1 | * | 5/2004 | Jojic et al. ..................... 345/716 |
| 2004/0172249 A1 | | 9/2004 | Taylor et al. |
| 2004/0193398 A1 | | 9/2004 | Chu et al. |
| 2005/0119890 A1 | | 6/2005 | Hirose |
| 2005/0131869 A1 | * | 6/2005 | Xie et al. .......................... 707/3 |
| 2005/0182630 A1 | | 8/2005 | Miro et al. |
| 2006/0053014 A1 | | 3/2006 | Yoshizawa |
| 2006/0178887 A1 | | 8/2006 | Webber |
| 2006/0212297 A1 | * | 9/2006 | Chaudhari et al. ............ 704/278 |
| 2006/0229874 A1 | | 10/2006 | Kaneyasu |
| 2008/0059190 A1 | * | 3/2008 | Chu et al. ...................... 704/258 |
| 2008/0243503 A1 | * | 10/2008 | Soong et al. .................. 704/244 |
| 2009/0254757 A1 | | 10/2009 | Toyama et al. |

FOREIGN PATENT DOCUMENTS

| | | |
|---|---|---|
| WO | 2005034083 A1 | 4/2005 |

OTHER PUBLICATIONS

Jorge Silva, Discrimination Measure for Hidden Markov Models, file:///D:/Rama/April%2028/PDF/Jorge%20Silva.html.

Jithendra Vepa and Simon King, Join Cost for Unit Selection Speech Synthesis, Chapter 3, pp. 35-62 2005.

Average Divergence distance as a statistical discrimination measure for hidden Markov, Silva, J, et al., Audio, Speech and Language Processing, IEEE Transactions, vol. 14, Issue 3, May 2006 pp. 890-906.

T. A. Myrvoll and F. K. Soong, "Optimal Clustering of Multivariate Normal Distributions Using Divergence and Its Application to HMM Adaptation," in *Proc. ICASSP'03*, I: 6-10,2003.

X.B. Li, F. K. Soong, T. A. Myrvoll and R.-H. Wang, "Optimal Clustering and Non-uniform Allocation of Gaussian Kernels in Scalar Dimension for HMM Compression," in *Proc. ICASSP'05*, I: 669-672, 2005.

M. N. Do, "Fast Approximation of Kullback-Leibler Distance for Dependence Trees and Hidden Markov Models," *IEEE Signal Proc. letters*, Apr. 2003.

J. Goldberger, "An efficient Image Similarity Measure based on Approximations of KL-Divergence between Two Gaussian Mixtures," in *Proc. ICCV'03*: 370-377, Nice, France, 2003.

S. Julier and J. K. Uhlmann, "A New Extension of the Kalman Filter to Non-linear Systems," *AeroSense: The 11th International Symposium on AeroSpace/Defense Sensing, Simulation and Control*, Florida, 1997.

G. Navarro, "A Guided Tour to Approximate String Matching," *ACM Computing Surveys*, 2001, 33(1): 31-88.

Silva J., Narayanan S., "A Statistical Discrimination Measure for Hidden Markov Models based on Divergence," International Conference on Spoken Language Processing, Korea, Oct. 4-8, 2004.

A. A. Kharkevich et al., "Problems of Information Transmission", Academy of Science USSR, The Faraday Press, Inc., New York, NY, 1966.

Gwo-Lang Yan, "A study on speech act modeling and verification of spontaneous speech with disfluency in a spoken dialogue system." Jul. 2004. Department of Computer Science and Information Engineering, National Cheng Kung University, Tainan, Taiwan, R.O.C.

Recent Improvements on Microsoft's Trainable Text-To-Speech System—Whistler, in Proc. ICASSP, 1997, pp. 959-962.

Statistical Modeling for Unit Selection in Speech Synthesis, Proceedings of the 42nd Annual Meeting of the Association for Computational Linguistics (ACL'2004), Jul. 1, 2004, pp. 55-62.

Bell Labs Text-to-Speech Synthesis, Lucent Technologies, Bell Labs Innovations, copyright 1997.

A. Black and N. Campbell, "Optimising selection of units from speech databases for concatenative synthesis," in Proc. of Eurospeech 1995, Madrid, Spain, 1995.

Y. Stylianou and A.K. Syrdal, "Perceptual and objective detection of discontinuities in concatenative speech synthesis," in Proc. of ICSLP2002, Denver, 2002.

J. Vepa, S. King, and P. Taylor, "Objective distance measures for spectral discontinuities in concatenative speech synthesis," in Proc. of ICSLP2002, Denver, 2002.

M. Chu and H. Peng, "An objective measure for estimating MOS of synthesized speech", in Proc. of Eurospeech2001, Aalborg, 2001.

H. Peng, Y. Zhao and M. Chu, "Perpetually optimizing the cost function for unit selection in a TTS system with one single run of MOS evaluation," in Proc. of ICSLP2002, Denver, 2002.

M. Chu, H. Peng, Y. Zhao, Z. Niu and E. Chang, "Microsoft Mulan—a bilingual TTS system," in Proc. of ICASSP2003, Hong Kong, 2003.

S. Kullback and R. A. Leibler, "On Information and Sufficiency", in Ann. Math. Stat., 22: 79-86, 1951.

T.M. Cover et al., Elements of Information Theory, Wiley Interscience, New York, NY, 1991, pp. 18-19.

M. N. Do, "Fast Approximation of Kullback-Leibler Distance for Dependences Trees and Hidden Markov Models," IEEE signal Proc. letters, Apr. 2003.

Prosecution Documents associated with U.S. Appl. No. 11/508,093 comprising: Office Action mailed Apr. 14, 2010 Response to Restriction Requirement filed Mar. 2, 2010 Restriction Requirement mailed Feb. 18, 2010.

Measuring Target Cost in Unit Selection with K1-Divergence Between Context-Dependent HMMS, Yong Zhao Peng Liu Yusheng Li Yining Chen Min Chu, Microsoft Res. Asia, Beijing;, This paper appears in: *Acoustics, Speech and Signal Processing, 2006. ICASSP 2006 Proceedings. 2006 IEEE International Conference* on Publication Date: May 14-19, 2006, vol. 1, on pp. I-I Current Version Published: Jul. 24, 2006.

Min Chu, Office Action mailed Feb. 18, 2010, U.S. Appl. No. 11/508,093, filed Aug. 22, 2006.

Min Chu, Office Action mailed Apr. 14, 2010, U.S. Appl. No. 11/508,093, filed Aug. 22, 2006.

Min Chu, Office Action mailed Oct. 13, 2010, U.S. Appl. No. 11/508,093, filed Aug. 22, 2006.

U.S. Appl. No. 11/508,093, filed Aug. 22, 2006, now Publication No. 2008-0059190, Publication Date Mar. 6, 2008.

Peng et al., H.; "Perpetually Optimizing the Cost Function for Unit Selection in a TTS System with One Single Run of MOS Evaluation," Proc. of ICSLP 2002, Denver. pp. 2613-2616.

\* cited by examiner

CALCULATING COST MEASURES BETWEEN HMM ACOUSTIC MODELS

BACKGROUND

The discussion below is merely provided for general background information and is not intended to be used as an aid in determining the scope of the claimed subject matter.

In speech processing such as but not limited to speech recognition and speech synthesis, a reoccurring problem is measuring the similarity of two given speech units, e.g. phones, words. Although acoustic models for speech units have taken many forms, one particularly useful form is the Hidden Markov Model (HMM) acoustic model, which describes each speech unit statistically as an evolving stochastic process. Commonly, Gaussian Mixtures Models, which are flexible to fit various spectrums as continuous probability distributions, are widely adopted as a default standard for the acoustic models.

Kullback-Leibler Divergence (KLD) is a meaningful statistical measure of the dissimilarity between probabilistic distributions. However, problems exist in order to perform a KLD calculation to measure the acoustic similarity of two speech units. One significant problem is caused by the high model complexity. Actually, the KLD between two Gaussian mixtures cannot be computed in a closed form, and therefore, an effective approximation is needed. In statistics, KLD arises as an expected logarithm of the likelihood ratio, so it can be approximated by sampling based Monte-Carlo algorithm, in which an average over a large number of random samples is generated. Besides this basic sampling method, Gibbs sampling and Markov Chain Monte Carlo (MCMC) can be used, but they are still too time-consuming to be applied to many practical applications.

KLD rate has also been used as a calculation between two HMMs. However, the physical meaning of KLD and KLD rate are different. KLD rate measures the similarity between the steady-states of the two HMM processes, while KLD compares the two entire processes. In speech processing, the dynamic evolution can be more important than the steady-states, so it is necessary to measure KLD directly. Nevertheless, a closed form solution is not available when using Gaussian Mixture Models (GMMs).

SUMMARY

The Summary and Abstract are provided to introduce a selection of concepts in a simplified form that are further described below in the Detailed Description. The Summary and Abstract are not intended to identify key features or essential features of the claimed subject matter, nor are they intended to be used as an aid in determining the scope of the claimed subject matter. In addition, the claimed subject matter is not limited to implementations that solve any or all disadvantages noted in the background.

Use of Kullback-Leibler Divergence (KLD) has been discovered to be a useful measurement between hidden Markov models (HMM) of acoustic models such as acoustic models used in but not limited to speech synthesis. In particular measurement of KLD utilizes an unscented transform to approximate KLD between the Gaussian mixtures of the HMM acoustic models. In one aspect, a method for measuring the total Kullback-Leibler Divergence of two hidden Markov models (HMM) includes calculating an individual KLD for each pair of states, state by state, for the two HMMs. The individual KLDs are then summed together to obtain a total KLD for the two HMMs.

In a further embodiment, in order to make a comparison between HMMs having a different number of states, modifications are made to one or both of the HMMs in order to equalize the number of states so that individual KLDs can be calculated on a state by state basis. The modifications include operations taken from a set of operations including inserting a state, deleting a state and substituting a state. Each operation includes a corresponding penalty value. Modifications are made in order to minimize the total of the penalty values.

DETAILED DESCRIPTION

Figure 1:
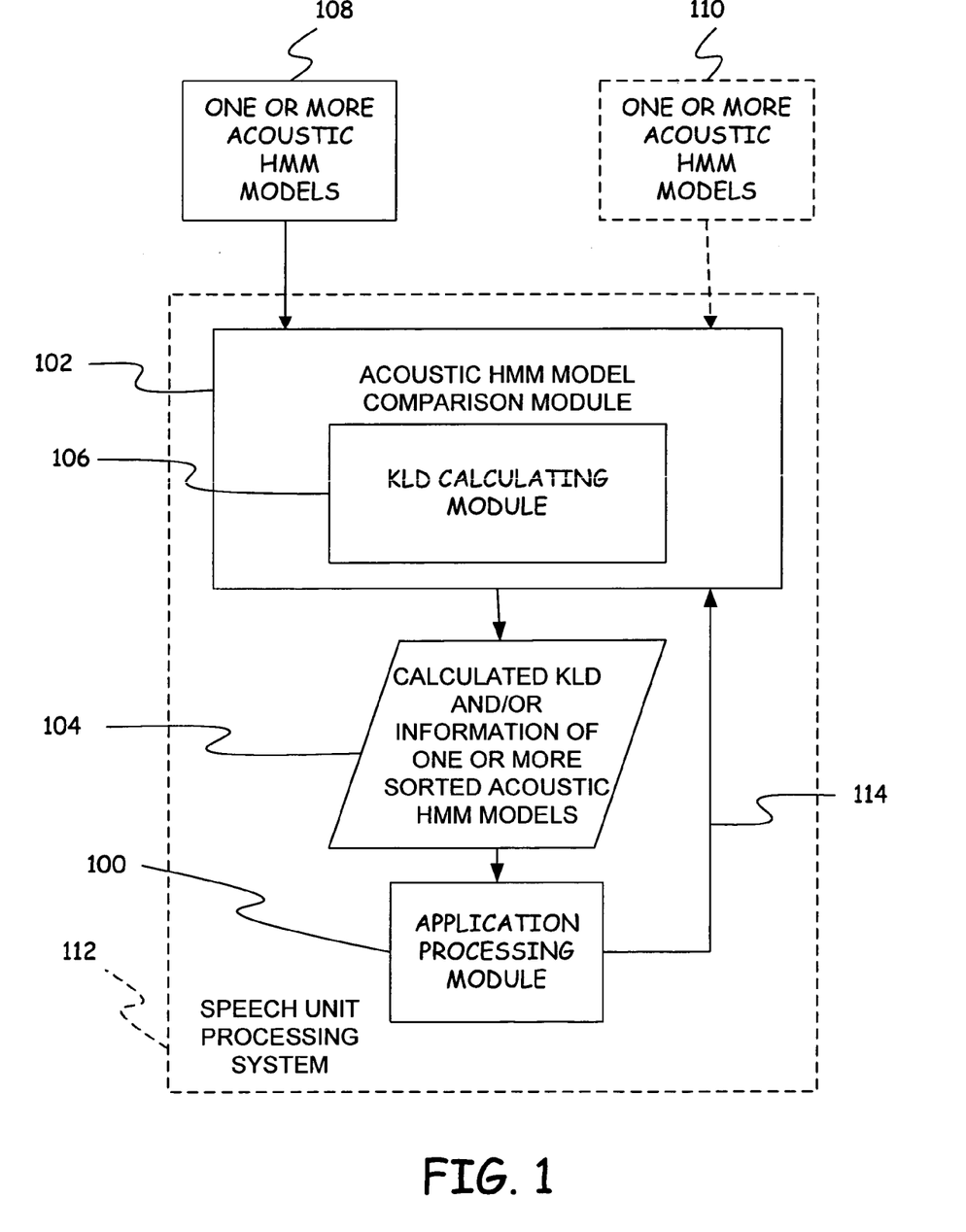
FIG. 1 is a block diagram of a language processing system.

An application processing module that uses speech units in the form of acoustic HMM models is illustrated at 100. Application processing module 100 generically represents any one or a combination of well known speech processing applications such as but not limited to speech recognition, training of acoustic HMM models for speech recognizers, speech synthesis, or training of acoustic HMM models for speech synthesizers.

An acoustic HMM model comparison module 102 provides as an output 104 information related to one or more sorted acoustic HMM models that is used by the application processing module 100. For instance, the output information 104 can comprise the actual acoustic HMM model(s), or an identifier(s) used to obtain the actual acoustic HMM model(s).

The acoustic HMM model comparison module 102 uses a KLD calculating module 106. The KLD calculating module 106 obtains an approximation of the KLD using an unscented transform between the Gaussian mixtures of two HMM acoustic models, provided either from a single set of acoustic HMM models 108, or a comparison between pairs of HMM models taken from the acoustic HMM model(s) in set 108 and one or more acoustic HMM model(s) in set 110. In a further embodiment, a speech unit processing system 112 can include both the application processing module 100 and the acoustic HMM model comparison module 102 with feedback 114, if necessary, between the modules.

Figure 3:
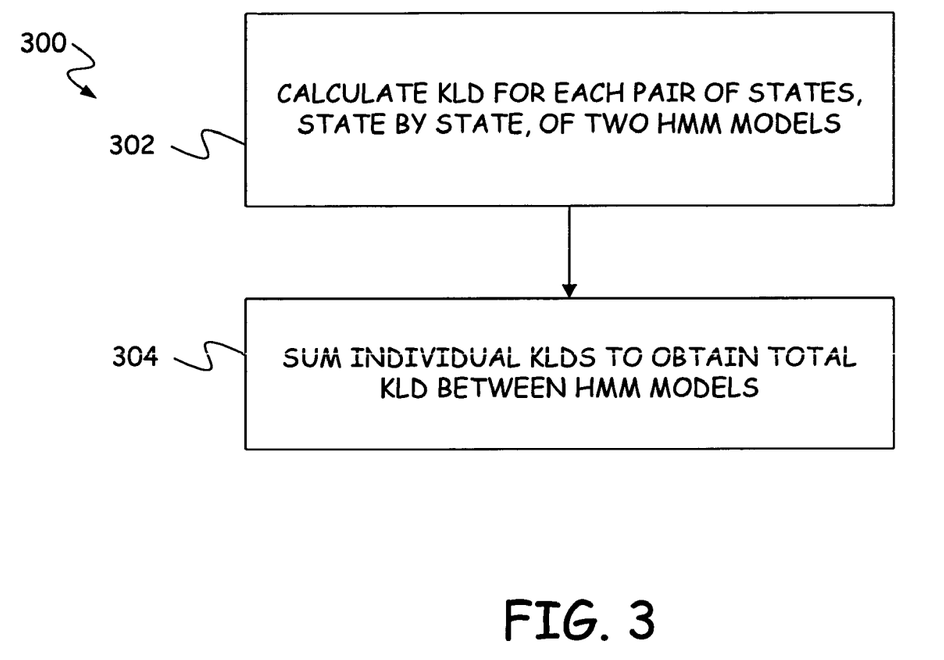
FIG. 3 is a flowchart of a method for calculating KLD.

Kullback-Leibler Divergence (KLD) is used to measure the dissimilarity between two HMM acoustic models. In terms of KLD, the target cost can be represented as:

$$C^t(t, u) = \sum_{j=1}^{J} w_j^t D(T_j \| U_j) \quad (2)$$

where $T_j$ and $U_j$ denote the target and candidate models corresponding to unit feature $t_j$ and $u_j$, respectively. For purposes of explanation, the target cost can be defined based on phonetic and prosodic features (i.e. a phonetic target sub-cost and a prosodic target sub-cost). A schematic diagram of measuring the target cost for a first HMM $t_i$ 202 and a second HMM $u_j$ 204 with KLD 206 is illustrated in FIG. 3.

Kullback-Leibler Divergence (KLD) is a meaningful statistical measure of the dissimilarity between two probabilistic distributions. If two N-dimensional distributions are respectively assigned to probabilistic or statistical models M and $\tilde{M}$ of x (where untilded and tilded variables are related to the target model and its competing model, respectively), KLD between the two models can be calculated as:

$$D(M \| \tilde{M}) = \int P(x|M) \log \frac{P(x|M)}{P(x|\tilde{M})} dx \quad (3)$$

However, given two stochastic processes, it is usually cumbersome to calculate their KLD since the random variable sequence can be infinite in length. Although a procedure has been advanced to approximate KLD rate between two HMMs, the KLD rate only measures the similarity between steady-states of two HMMs, while at least with respect to acoustic processing, such as speech processing, the dynamic evolution is of more concern than the steady-states.

KLD between two Gaussian mixtures forms the basis for comparing a pair of acoustic HMM models. In particular, using an unscented transform approach, KLD between two N dimensional Gaussian mixtures $$b(o) = \sum_{m=1}^{M} w_m \mathcal{N}(o; \mu_m, \Sigma_m) \text{ and } \tilde{b}(o) = \sum_{m=1}^{\tilde{M}} \tilde{w}_m \mathcal{N}(o; \tilde{\mu}_m, \tilde{\Sigma}_m)$$

(where o is the sigma point, w is the kernel weight μ is the mean vector, Σ is the covariance matrix, m is index of M Gaussian kernels) can be approximated by:

$$D(b \| \tilde{b}) \approx \frac{1}{2N} \sum_{m=1}^{M} w_m \sum_{k=1}^{2N} \log \frac{b(o_{m,k})}{\tilde{b}(o_{m,k})} \quad (4)$$

where $o_{m,k}$ is the $k^{th}$ sigma point in the $m^{th}$ Gaussian kernel of M Gaussian kernels of b.

Use of the unscented transform is useful in comparing HMM models.

As is known, HMMs for phones can have unequal number of states. In the following, a synchronous state matching method is used to first measure the KLD between two equal-length HMMs, then it is generalized via a dynamic programming algorithm for HMMs of different numbers of states. It should be noted, all the HMMs are considered to have a no skipping, left-to-right topology.

In left-to-right HMMs, dummy end states are only used to indicate the end of the observation, so it is reasonable to endow both of them an identical distribution, as a result, $D(b_J \| \tilde{b}_{\tilde{J}})=0$. Based on the following decomposition of π (vector of initial probabilities), A (state transition matrix) and d (distance between two states):

$$\pi = \begin{pmatrix} \pi' \\ 0 \end{pmatrix}, \quad A = \begin{pmatrix} A' & * \\ 0 & 1 \end{pmatrix}, \quad d = \begin{pmatrix} d' \\ 0 \end{pmatrix}$$

the following relationship is obtained:

$$\pi^T \sum_{t=1}^{\tau} A^{t-1} d = \pi'^T \sum_{t=1}^{\tau} A'^{t-1} d'$$

where T represent transpose, t is time index and τ is the length of observation in terms of time.

Figure 2:
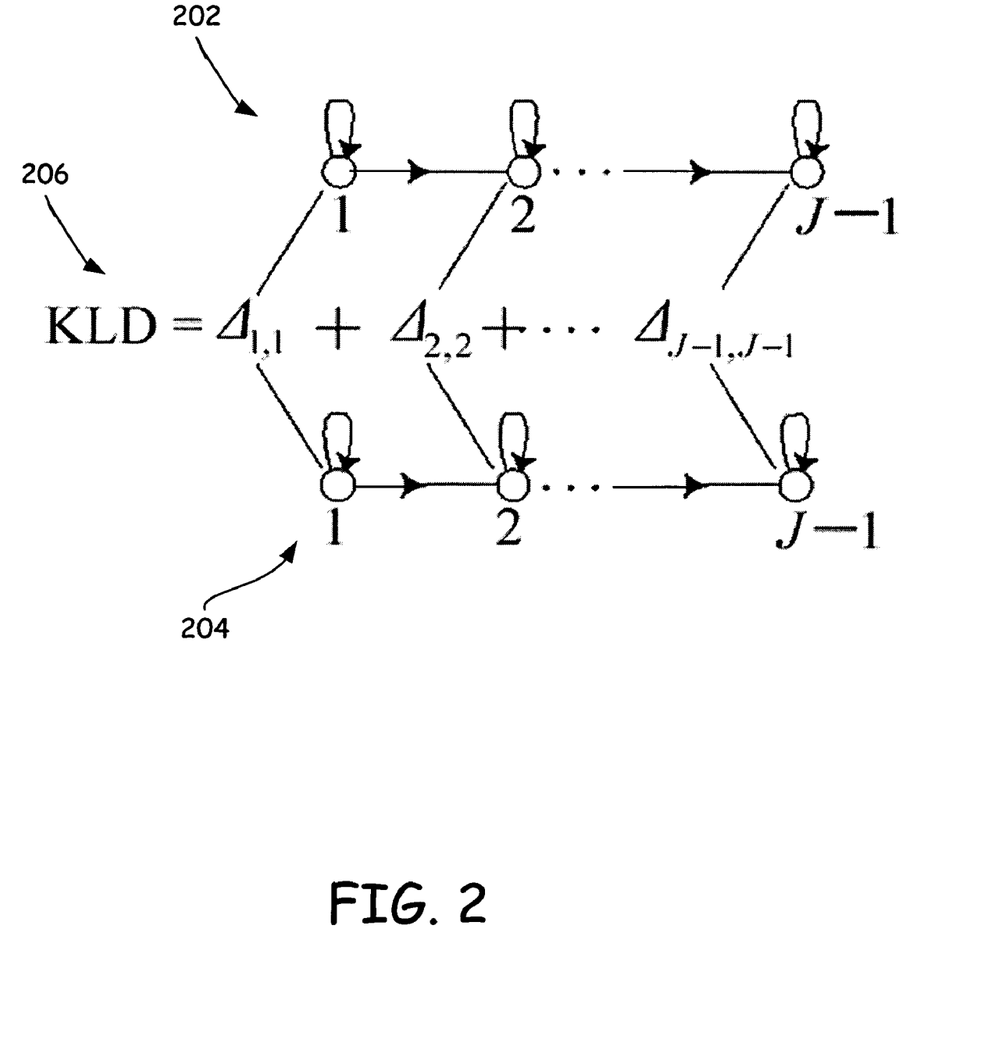
FIG. 2 is a schematic diagram illustrating mismatch between HMM models.

By substituting, $$\pi = \begin{pmatrix} 1 \\ 0 \\ 0 \\ \vdots \\ 0 \\ 0 \end{pmatrix} \quad A = \begin{pmatrix} a_{11} & a_{12} & 0 & \cdots & 0 & 0 \\ 0 & a_{22} & a_{23} & \cdots & 0 & 0 \\ \vdots & \vdots & \ddots & \ddots & \vdots & \vdots \\ 0 & 0 & 0 & \ddots & a_{J-2,J-1} & 0 \\ 0 & 0 & 0 & \cdots & a_{J-1,J-1} & a_{J-1,J} \\ 0 & 0 & 0 & \cdots & 0 & 1 \end{pmatrix}$$

an approximation of KLD for symmetric (equal length) HMMs can be represented as:

$$D_S(\mathcal{H} \| \tilde{\mathcal{H}}) \le \sum_{i=1}^{J-1} \Delta_{i,i}$$

where $\Delta_{i,j}$ represents the symmetric KLD between the $i^{th}$ state in the first HMM and the $j^{th}$ state in the second HMM, and can be represented as:

$$\Delta_{i,j} = \underbrace{\left[D(b_i \| \tilde{b}_j) + \log \frac{a_{ii}}{\tilde{a}_{jj}}\right] l_i}_{\vec{\Delta}_{i,j}} + \underbrace{\left[D(\tilde{b}_j \| b_i) + \log \frac{\tilde{a}_{jj}}{a_{ii}}\right] \tilde{l}_j}_{\overleftarrow{\Delta}_{i,j}}$$

where $l_i = (1/1 - a_{ii})$ is the average duration of the $i^{th}$ state and the terms $\vec{\Delta}_{i,j}$ and $\overleftarrow{\Delta}_{i,j}$ represents the two asymmetric state KLDs respectively, which can be approximated based on equation (4) above. As illustrated in FIG. 2 and referring to FIG. 3, a method 300 for calculating the total KLD for comparing two HMMs (based on an unscented transform) is to calculate a KLD for each pair of states, state by state, at step 302, and sum the individual state KLD calculations to obtain the total KLD at step 304.

Having described calculation of KLD for equal length HMMs, a more flexible KLD method using Dynamic Programming (DP) will be described to deal with two unequal-length left-to-right HMMs, where J and $\tilde{J}$ will be used to denote the state numbers of the first and second HMM, respectively.

In a state-synchronized method as described above and illustrated in FIG. 3, KLD is calculated state by state for each corresponding pair. In order to relax the constraint, a simple case, where a 2-state and a 1-state HMMs with the following transition matrices $$A = \begin{pmatrix} a_{11} & 1-a_{11} & 0 \\ 0 & a_{22} & 1-a_{22} \\ 0 & 0 & 1 \end{pmatrix}, \quad \tilde{A} = \begin{pmatrix} \tilde{a}_{11} & 1-\tilde{a}_{11} \\ 0 & 1 \end{pmatrix}$$

will first be compared.

It can be shown that that the upper bound can be represented as $$D_s(H\|\tilde{H}) \leq \Delta_{1,1} + \Delta_{2,1} + \phi(\tilde{a}_{11}, a_{11}, a_{22}) \tag{5}$$

where $\phi(\tilde{a}_{11}, a_{11}, a_{22})$ is a penalty term following the function $\phi(z,x,y)=(1-z)/(1-x)+(1-z)/(1-y)$. Although it is to be appreciated that any suitable penalty may be used, including a zero penalty.

Figure 4:
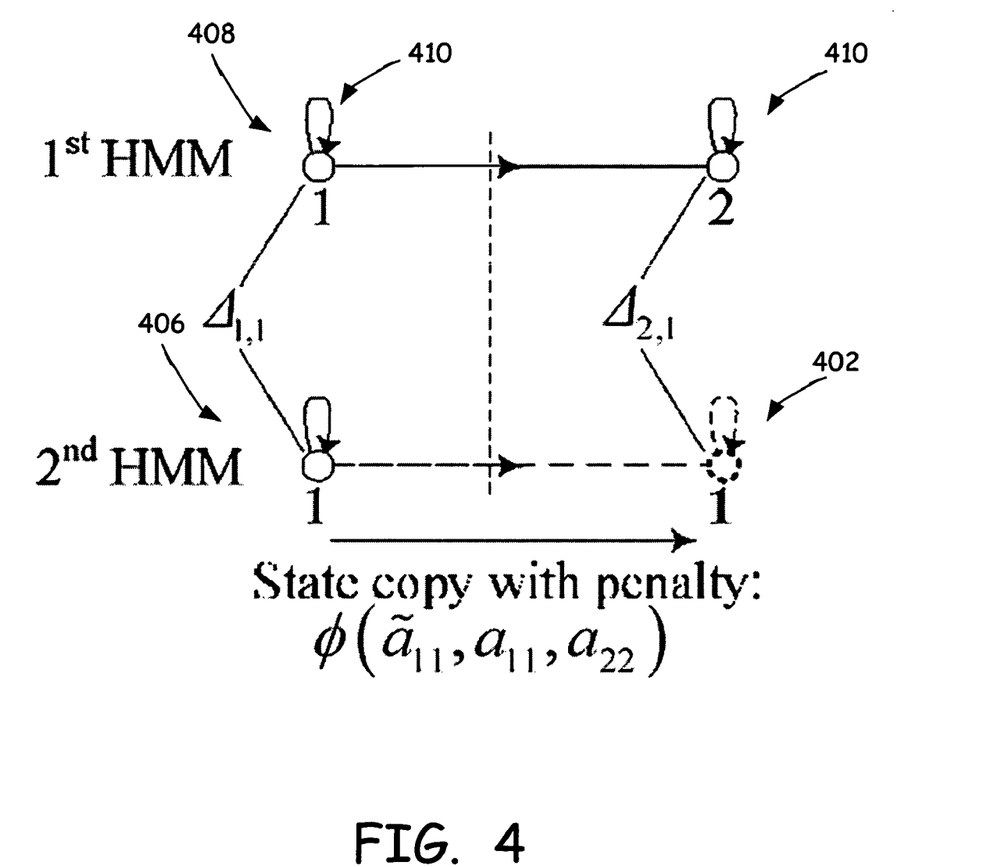
FIG. 4 is a schematic diagram of state duplication (copy) with a penalty.
Figure 7:
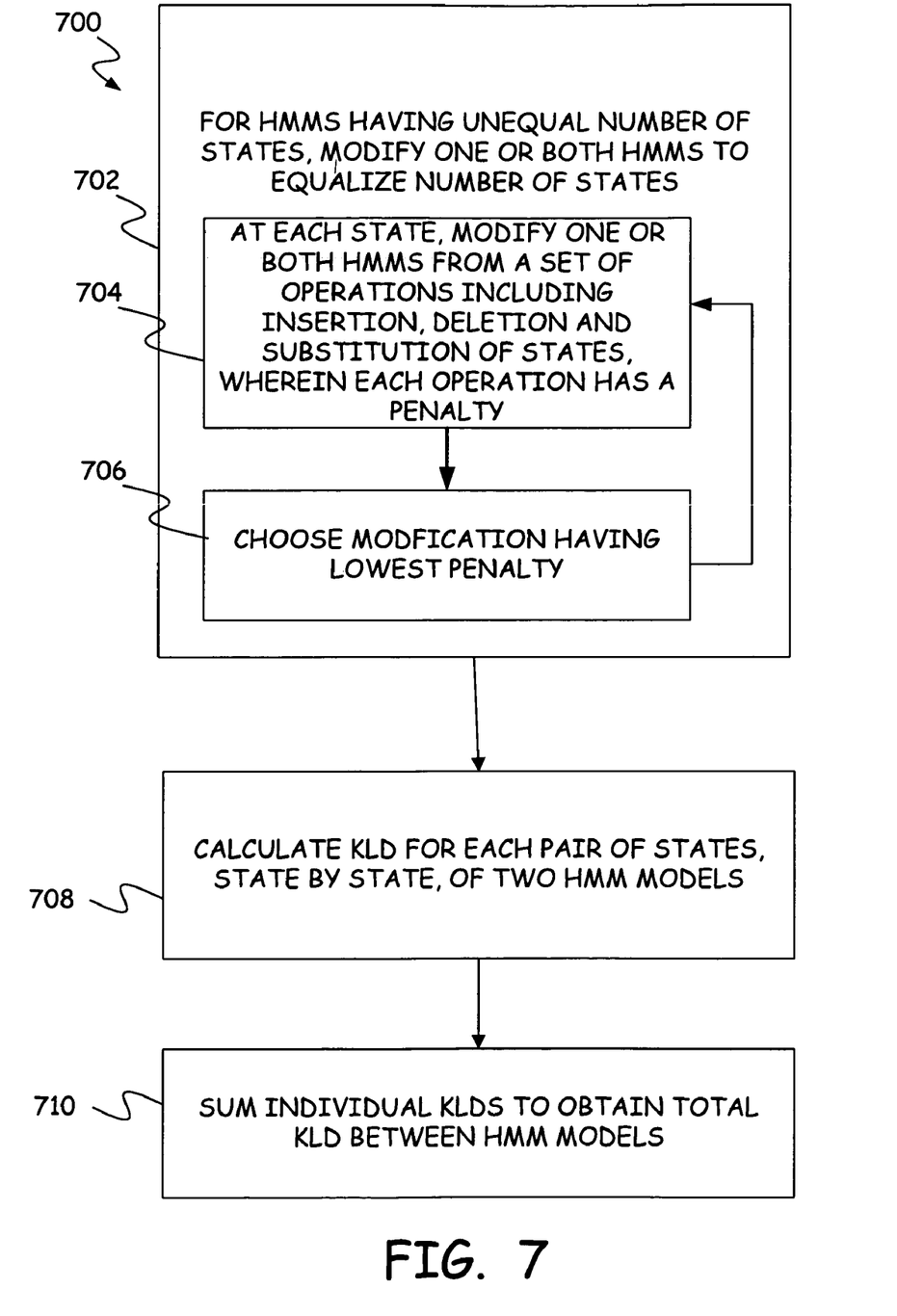
FIG. 7 is a flowchart for the diagram of FIG. 10.
Figure 8:
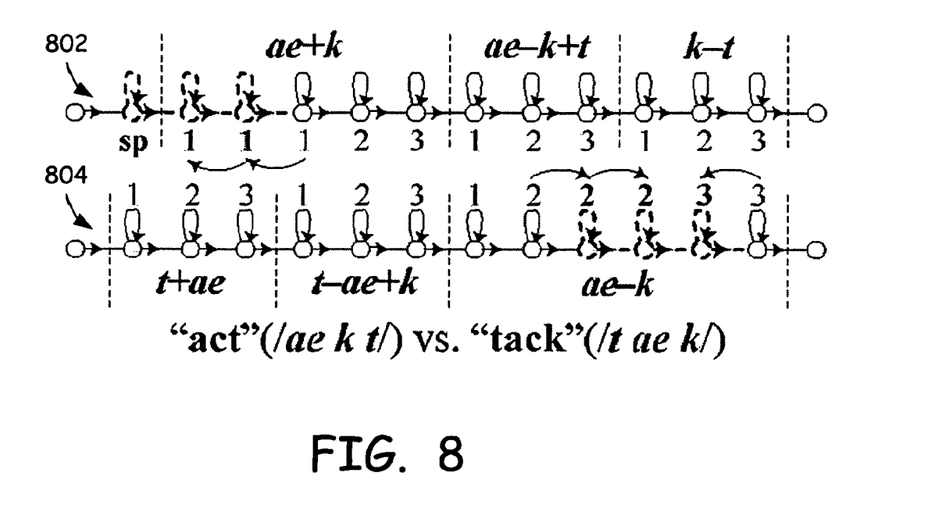
FIG. 8 is one illustrative example of state matching of two HMMs.

Referring to FIG. 7, KLD can be calculated between a 2-state HMM and a 1-state HMM as follows: First, convert 702 the 1-state HMM to a 2-state HMM one by duplicating its state and add a penalty of $\phi(\tilde{a}_{11}, a_{11}, a_{22})$. Then, calculate 708 and sum 710 up the KLD state pair by state pair using the state-synchronized method described above. As illustrated in FIG. 4, a schematic diagram of state duplication (copy) 402 with a penalty 404 is one form of technique that can be used to create an equal number of states between the HMMs. As illustrated in FIG. 8, the HMM 406 has added state 402 to create two states paired equally with the two states 410 of HMM 408.

It has been discovered that the calculation of KLD between two HMMs can be treated in a manner similar to a generalized string matching process, where state and HMM are counterparts of character and string, respectively. Although various algorithms as is known can be used as is done in string matching, in one embodiment, the basic DP algorithm (Seller, P., "The Theory and Computation of Evolutionary Distances: Pattern Recognition", *Journal of Algorithms.* 1: 359-373, 1980) based on edit distance (Levenshtein, V., "Binary Codes Capable of Correcting Spurious Insertions and Deletions of Ones", *Problems of information Transmission,* 1:8-17, 1965) can be used. The algorithm is flexible to adaptation in the present application.

In string matching, three kinds of errors are considered: insertion, deletion and substitution. Edit distances caused by all these operations are identical. In KLD calculation, they should be redefined to measure the divergence reasonably. Based on Equation (5) and the atom operation of state copy, generalized edit distances can be defined as:

Generalized substitution distance: If the $i^{th}$ state in the first HMM and the $j^{th}$ state in the second HMM are compared, the substitution distance should be $\delta_s(i,j)=\Delta_{i,j}$.

Generalized insertion distance: During DP, if the $i^{th}$ state in the first HMM is treated as a state insertion, three reasonable choices for its competitor in the $2^{nd}$ HMM can be considered:

(a) Copy the $j^{th}$ state in the second HMM forward as a competitor, then the insertion distance is $$\delta_{IF}(i,j)=\Delta_{i-1,j}+\Delta_{i,j}+\phi(\tilde{a}_{jj},a_{i-1,i-1},a_{ii})-\Delta_{i,j}=\Delta_{i,j}+\phi(\tilde{a}_{jj},a_{i-1,i-1},a_{ii}).$$

(b) Copy the $j+1^{th}$ state in the second HMM backward as a competitor, then the insertion distance is $$\delta_{IB}(i,j)=\Delta_{i,j+1}+\Delta_{i+1,j+1}+\phi(\tilde{a}_{j+1,j+1},a_{ii},a_{i+1,i+1})-\Delta_{i+1,j+1}=\Delta_{i,j+1}+\phi(\tilde{a}_{j+1,j+1},a_{ii},a_{i+1,i+1}).$$

Figure 5:
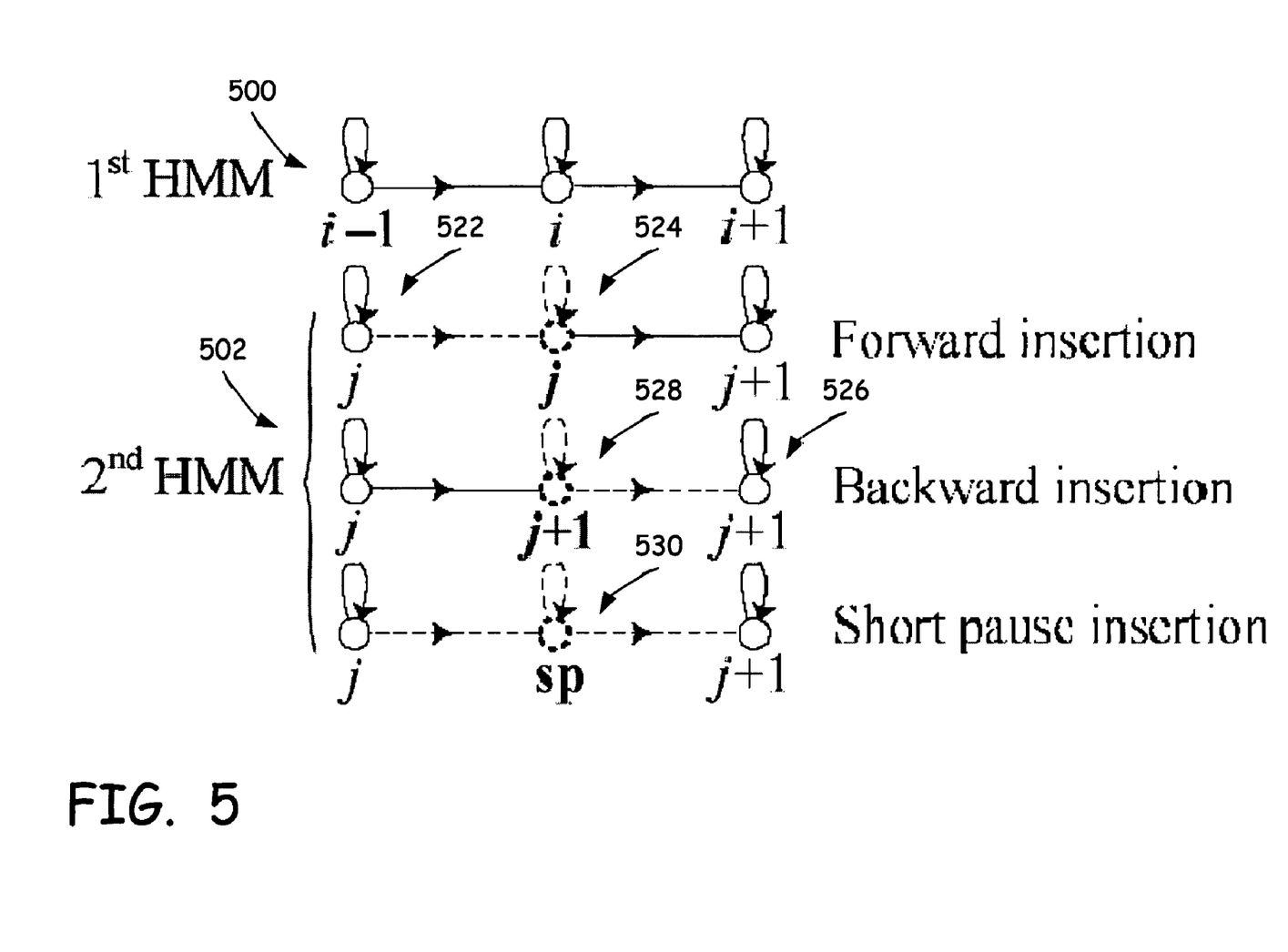
FIG. 5 is a schematic diagram illustrating possible operations to add a state to an HMM.

(c) Incorporate a "non-skippable" short pause (sp) state in the second HMM as a competitor with the $i^{th}$ states in the first HMM, and the insertion distance is defined as $\delta_{IS}(i,j)=\Delta_{i,sp}$. Here the insertion of the sp state is not penalized because it is treated as a modified pronunciation style to have a brief stop in some legal position. It should be noted that the short pause insertion is not always reasonable, for example, it may not appear at any intra-syllable positions. FIG. 5 illustrates each of the foregoing possibilities with the first HMM 500 being compared to a second HMM 502 that may have a state 922 copied forward to state 924, a state 926 copied backward to state 928, or a short pause 930 inserted between states 932 and 934.

Generalized deletion distance: A deletion in the first HMM can be treated as an insertion in the second HMM. So the competitor choices and the corresponding distance are symmetric to those in state insertion:

$$\delta_{DF}(i,j)=\Delta_{i,j}+\phi(a_{ii},\tilde{a}_{j-1,j-1},\tilde{a}_{jj}),$$

$$\delta_{DB}(i,j)=\Delta_{i+1,j}+\phi(a_{i+1,i+1},\tilde{a}_{jj},\tilde{a}_{j+1,j+1}),$$

$$\delta_{DS}(i,j)=\Delta_{sp,j}.$$

To deal with the case of HMM boundaries, the following are defined:

$$\Delta_{i,j}=\infty (i \notin [1,J-1] \text{ or } j \notin [1,\tilde{J}-1]),$$

$$\delta(a,\tilde{a}_{j-1,j-1},\tilde{a}_{jj})=\infty (j \notin [2,\tilde{J}-1]) \text{ and}$$

$$\delta(\tilde{a},a_{i-1,i-1},a_{jj})=\infty (i \notin [2,J-1])$$

In view of the foregoing, a general DP algorithm for calculating KLD between two HMMs regardless of whether they are equal in length can be described. This method is illustrated in FIG. 7 at 700. At step 702, if the two HMMs to be compared are of different length, one or both are modified to equalize the number of states. In one embodiment, as indicated at step 704, one or more modifications can be performed at each state from a set of operations comprising $\Omega=\{$Substitution(S), Forward Insertion (IF), Short pause Insertion (IS), Backward Insertion (IB), Forward Deletion (DF), Short pause Deletion (DS), Backward Deletion (DB)$\}$, where each of the operations of Insertion, Deletion and Substitution have a corresponding penalty for being implemented. At step 706, the operation having the lowest penalty is retained. Steps 704 and 706 are repeated until the HMMs are of the same length.

If desired, during DP at step 704, a $J \times \tilde{J}$ cost matrix C can be used to save information. Each element $C_{i,j}$ is an array of $\{C_{i,j,OP}\}$, $OP \in \Omega$, where $C_{i,j,OP}$ means the partially best result when the two HMMs reach their $i^{th}$ and $j^{th}$ states respectively, and the current operation is OP.

Figure 6:
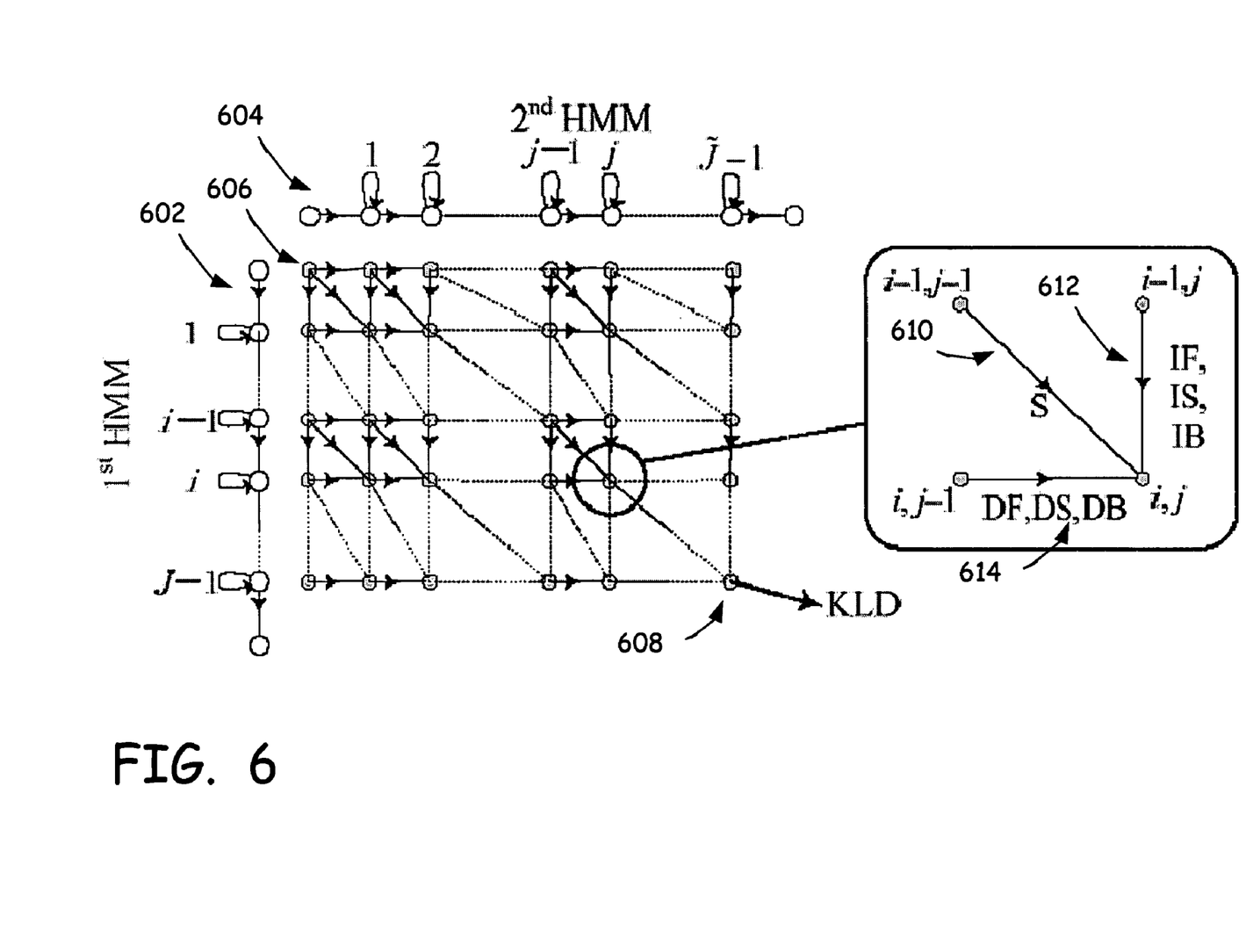
FIG. 6 is a schematic diagram illustrating modifying two HMMs based on a set of operations and calculating KLD.

FIG. 6 is a schematic diagram of the DP procedure as applied to two left-to-right HMMs, HMM 602, which as "i" states, and HMM 604, which has "j" states. FIG. 6 illustrates all of the basic operations, where the DP procedure begins at node 606 with the total KLD being obtained having reached node 608. In particular, transitions from various states include Substitution(S) indicated by arrow 610; Forward Insertion (IF), Short pause Insertion (IS) and Backward Insertion (IB) all indicated by arrow 612; and Forward Deletion (DF), Short pause Deletion (DS) and Backward Deletion (DB) all indicated by arrow 614.

Saving all or some of the operation related variables may be useful since the current operation depends on the previous one. A "legal" operation matrices listed in table 1 below may be used to direct the DP procedure. The left table is used when sp is incorporated, and the right one is used when it is forbidden.

TABLE 1

Legality of operation pairs

| | S | IF | IS | IB | DF | DS | DB |
|---|---|---|---|---|---|---|---|
| S  | ✓ | ✓ | ✓ | ✓ | ✓ | ✓ | ✓ |
| IF | ✓ | ✓ | ✓ | ✓ | ✓ | ✓ | ✓ |
| IS | ✓ | X | ✓ | ✓ | ✓ | ✓ | ✓ |
| IB | ✓ | X | X | ✓ | X | X | ✓ |
| DF | ✓ | ✓ | ✓ | ✓ | ✓ | ✓ | ✓ |
| DS | ✓ | ✓ | ✓ | ✓ | X | ✓ | ✓ |
| DB | ✓ | X | X | ✓ | X | X | ✓ |

Current operation (top); Rows - Prev. Operation
IS and DS are allowed

| | S | IF | IS | IB | DF | DS | DB |
|---|---|---|---|---|---|---|---|
| S  | ✓ | ✓ | X | ✓ | ✓ | X | ✓ |
| IF | ✓ | ✓ | X | ✓ | ✓ | X | ✓ |
| IS | ✓ | X | X | ✓ | ✓ | X | ✓ |
| IB | ✓ | X | X | ✓ | X | X | ✓ |
| DF | ✓ | ✓ | X | ✓ | ✓ | X | ✓ |
| DS | ✓ | ✓ | X | ✓ | X | X | ✓ |
| DB | ✓ | X | X | ✓ | X | X | ✓ |

Current operation (top); Rows - Prev. Operation
IS and DS are forbidden

For all $OP \in \Omega$, elements of cost matrix C can be filled iteratively as follows:

$$\begin{cases} C_{0,0,OP} = 0 \\ C_{i,0,OP} = \min_{OP_1 \in \Omega, (OP_1, OP) \text{ is legal}} C_{i-1,0,OP_1} + \delta_{OP}(i, 0), (0 < i \le J - 1) \\ C_{0,j,OP} = \min_{OP_1 \in \Omega, (OP_1, OP) \text{ is legal}} C_{0,j-1,OP_1} + \delta_{OP}(0, j), (0 < j \le \tilde{J} - 1) \\ C_{i,j,OP} = \min_{OP_1 \in \Omega, (OP_1, OP) \text{ is legal}} C_{From(i,j,OP),OP_1} + \delta_{OP}(i, j), (0 < i \le J - 1, 0 < j \le \tilde{J} - 1) \end{cases}$$

where From(i,j,OP) is the previous position given the current position (i,j) and current operation OP, from FIG. 6 it is observed:

$$From(i, j, OP) = \begin{cases} (i-1, j-1) & \text{if } OP = S \\ (i-1, j) & \text{if } OP \in \{IF, IS, IB\} \\ (i, j-1) & \text{if } OP \in \{DF, DS, DB\} \end{cases}$$

At the end of the dynamic programming, the KLD approximation can be obtained:

$$D_S(\mathcal{H} \| \tilde{\mathcal{H}}) \approx \min_{OP \in \Omega} C_{J-1, \tilde{J}-1, OP}$$

In a further embodiment, another $J \times \tilde{J}$ matrix B can be used as a counterpart of C at step 706 to save the best previous operations during DP. Based on the matrix, the best state matching path can be extracted by back-tracing from the end position (J−1, $\tilde{J}$−1)

Figure 10:
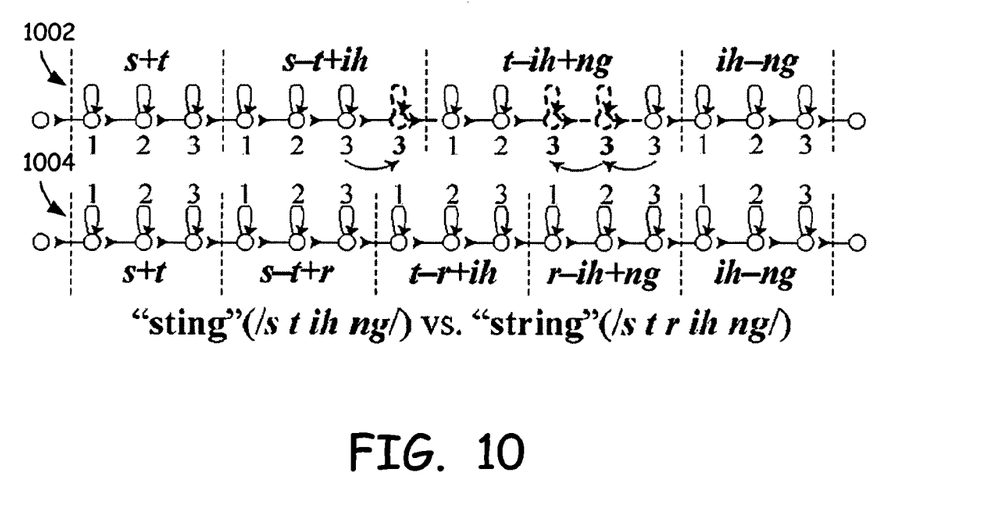
FIG. 10 is a second illustrative example of state matching of two HMMs.

FIG. 8 shows a demonstration of DP based state matching. In the case of FIG. 8, KLD between the HMMs of syllables "act" (/ae k t/) 802 and "tack" (/t ae k/) 804 are calculated. The two HMMs are equal in length with only slight difference: the tail phoneme in the first syllable is moved to head in the second one. From the figure, it can be seen that the two HMMs are well aligned according to their content, and a quite reasonable KLD value of 788.1 is obtained, while the state-synchronized result is 2529.5. In the demonstration of FIG. 10, KLD between the HMMs of syllables "sting" (/s t ih ng/) 1002 and "string" (/s t r ih ng/) 1004, where a phoneme r is inserted in the latter, are calculated. Because the lengths are unequal now, state synchronized algorithm is helpless, but DP algorithm is also able to match them with outputting a reasonable KLD value of 688.9.

In the state-synchronized algorithm, there is a strong assumption that the two observation sequences jump from one state to the next one synchronously. For two equal-length HMMs, the algorithm is quite effective and efficient. Considering the calculation of Δ as a basic operation, its computational complexity is O(J). This algorithm lays a fundamental basis for the DP algorithm.

In the DP algorithm, the assumption that the two observation sequences jump from one state to the next one synchronously is relaxed. After penalization, the two expanded state sequences corresponding to the best DP path are equal in length, so the state-synchronized algorithm (FIG. 2) can also be used in such case as illustrated by steps 708 and 710 (FIG. 7), which correspond substantially to steps 302 and 304, respectively. However, this algorithm is more effective in dealing with both equal-length HMMs and unequal-length HMMs, but it is less efficient with a computational complexity of $O(J \times \tilde{J})$.

Figure 9:
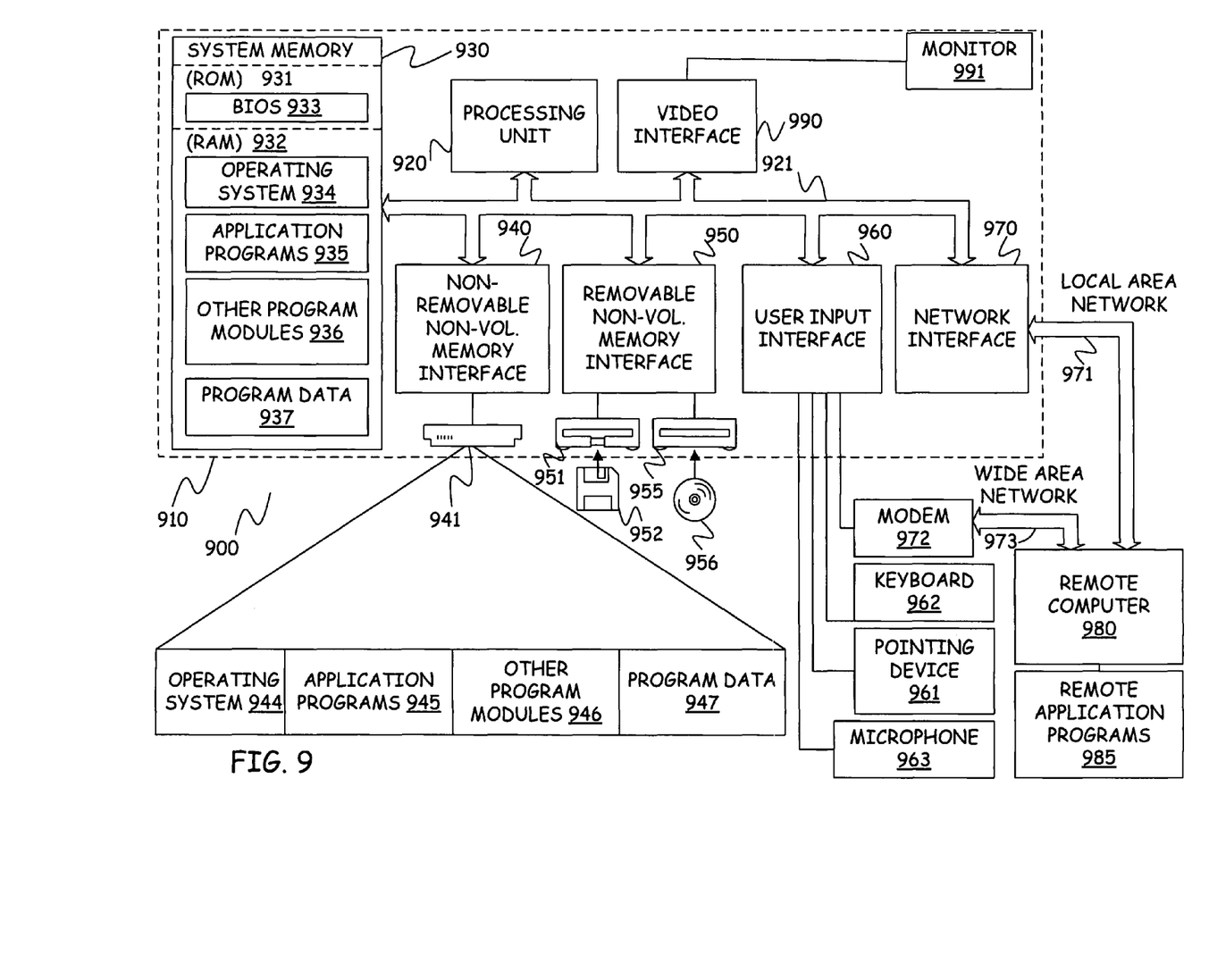
FIG. 9 is an exemplary computing environment.

FIG. 9 illustrates an example of a suitable computing system environment 900 on which the concepts herein described may be implemented. Nevertheless, the computing system environment 900 is again only one example of a suitable computing environment for each of these computers and is not intended to suggest any limitation as to the scope of use or functionality of the description below. Neither should the computing environment 900 be interpreted as having any dependency or requirement relating to any one or combination of components illustrated in the exemplary operating environment 900.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 9, an exemplary system includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 900.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937. Herein, the application programs 935, program modules 936 and program data 937 implement one or more of the concepts described above.

The computer 910 may also include other removable/non-removable volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962, a microphone 963, and a pointing device 961, such as a mouse, trackball or touch pad. These and other input devices are often connected to the processing unit 920 through a user input interface 960 that is coupled to the system bus, but may be connected by other interface and bus structures, such as a parallel port or a universal serial bus (USB). A monitor 991 or other type of display device is also connected to the system bus 921 via an interface, such as a video interface 990.

The computer 910 may operate in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 9 include a locale area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user-input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on remote computer 980. It will be appreciated that the network connections shown are exemplary and other means of establishing a communications link between the computers may be used.

It should be noted that the concepts herein described can be carried out on a computer system such as that described with respect to FIG. 9. However, other suitable systems include a server, a computer devoted to message handling, or on a distributed system in which different portions of the concepts are carried out on different parts of the distributed computing system.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A computer-implemented method for measuring the total Kullback-Leibler Divergence (KLD) of two hidden Markov models (HMM), the two HMMs including a first HMM having a first number of states and a second HMM having a second, different number of states, the method comprising:
    modifying both the first number of states in the first HMM and the second number of states in the second HMM to equalize the first number and the second number of states, wherein modifying includes performing a series of operations relative to a plurality of states of the first HMM and the second HMM comprising:
        for each of the plurality of states, identifying penalty values associated with one or more possible modification operations relative to the state, the one or more possible modification operations being taken from a set of modification operations including deleting a state of at least one of the HMMs and substituting a state of at least one of the HMMs;
        selecting one or more of the possible modification operations that equalizes the number of states of the two HMMs and minimizes a total of the penalty values; and
        performing the one or more selected modification operations to equalize the number of states of the two HMMs;
    after modifying the first and the second HMMs to equalize the number of states, calculating an individual KLD for each pair of states, state by state, for the two HMMs, using a processor of a computer;
    summing the individual KLDs together to obtain a total KLD for the two HMMs; and
    outputting the total KLD.

2. The method of claim 1 wherein the step of modifying includes assigning an associated penalty value to the modification.

3. The method of claim 2 wherein the step of modifying includes modifying at least one of the HMMs in a manner to minimize the penalty value.

4. The method of claim 1 wherein modifying includes inserting a state in one of the HMM models.

5. The method of claim 1 wherein modifying includes deleting a state in one of the HMM models.

6. The method of claim 1 wherein modifying includes substituting a state for one of the states in one of the HMM models.

7. The method of claim 1 wherein modifying includes inserting a non-skippable short pause (sp) state in one of the HMM models.

8. A computer readable medium having instructions which when executed by a computer perform a method for measuring the total Kullback-Leibler Divergence (KLD) of two hidden Markov models (HMM), the two HMMs including a first HMM having a first number of states and a second HMM having a second, different number of states, the method comprising:
    modifying at least one of the HMMs to equalize the first number of states and the second number of states, wherein modifying includes performing a series of operations to at least one of the HMMs, the operations including duplicating a state of one of the first and the second HMMs such that the HMM of the one of the first and the second HMMs includes the state and a copy of the state;
    calculating an individual KLD using a processor of the computer for each pair of states, state by state, for the two HMMs; and
    summing the individual KLDs together to obtain a total KLD for the two HMMs.

9. The computer readable medium of claim 8 wherein the step of modifying includes assigning an associated penalty value to the modification.

10. The computer readable medium of claim 9 wherein the step of modifying includes modifying at least one of the HMMs in a manner to minimize the penalty value.

11. The computer readable medium of claim 10 wherein the operations further include inserting a state in one of the HMM models.

12. The computer readable medium of claim 10 wherein the operations further include deleting a state in one of the HMM models.

13. The computer readable medium of claim 10 wherein the operations further include substituting a state for one of the states in one of the HMM models.

14. The computer readable medium of claim 10 wherein the operations further include inserting a non-skippable short pause (sp) state in one of the HMM models.

15. A system for comparing a pair of acoustic hidden Markov models (HMMs), the system comprising:
    a first acoustic hidden Markov model (HMM) having a first number of states;
    a second acoustic HMM having a second number of states, the second number being different than the first number; and
    a KLD (Kullback-Leibler Divergence) calculating module configured to:
        receive the first and second acoustic HMMs;
        modify at least one of the first and second acoustic HMMs to equalize the first and second number of states, wherein the KLD calculating module is configured to, for each of the first and second number of states, calculate penalty values for possible state modification operations, wherein the KLD calculating module is configured to select and perform one or more of the possible state modification operations that both equalizes the number of states of the first and second acoustic HMMs and minimizes a total of the penalty values, wherein one of the one or more possible state modification operations includes duplicating a state of one of the first and the second acoustic HMMs such that the HMM of the one of the first and the second acoustic HMMs includes the state and a copy of the state;
        calculate the KLD between the first and second acoustic HMMs using a processor of a computer by calculating the KLD from individual KLDs for each pair of states, state by state, for the first and second acoustic HMMs, the KLD calculating module further configured to provide as an output at least one of the calculated KLD and information related to sorting of the first and second acoustic HMMs.

16. The system of claim 15 and further comprising an application processing module configured to receive the output and perform a task related to processing speech units.

* * * * *